Jan. 4, 1966     O. ZUMKELLER     3,228,032
RECORDING APPARATUS FOR MAKING DISTINGUISHABLE RECORDINGS
Filed Oct. 19, 1962     2 Sheets-Sheet 1
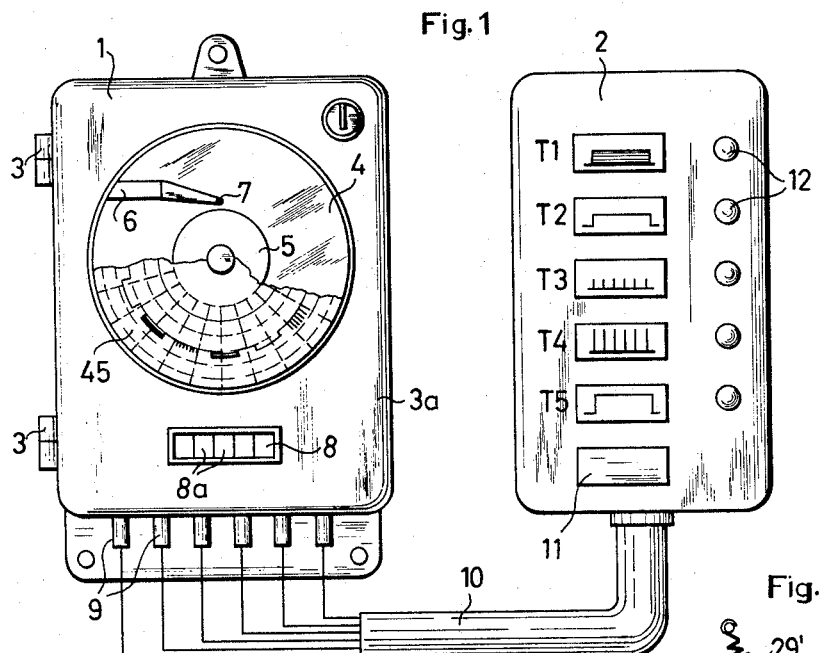
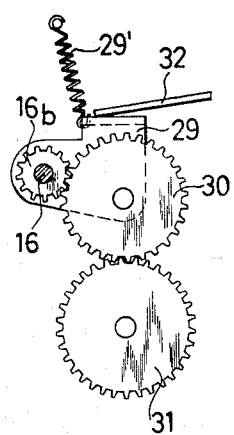
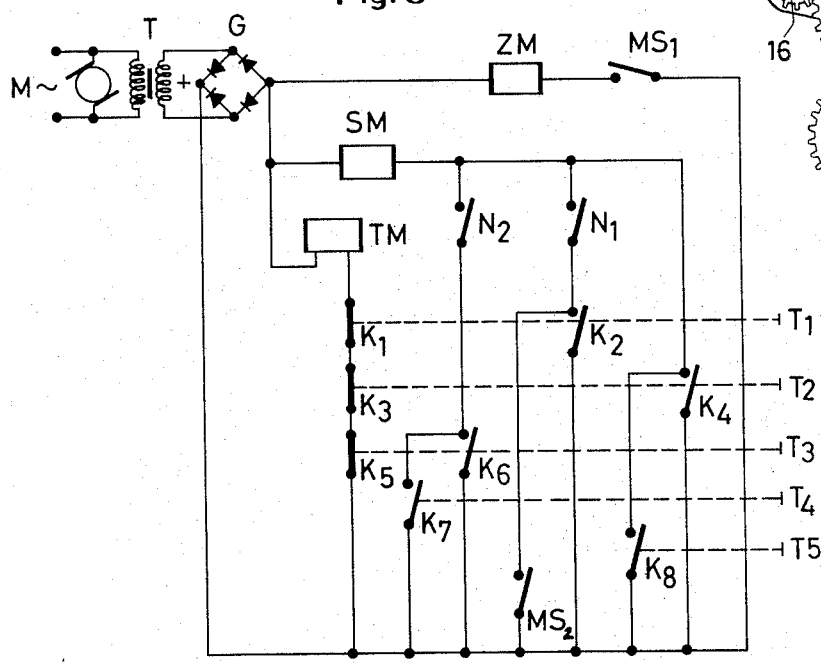

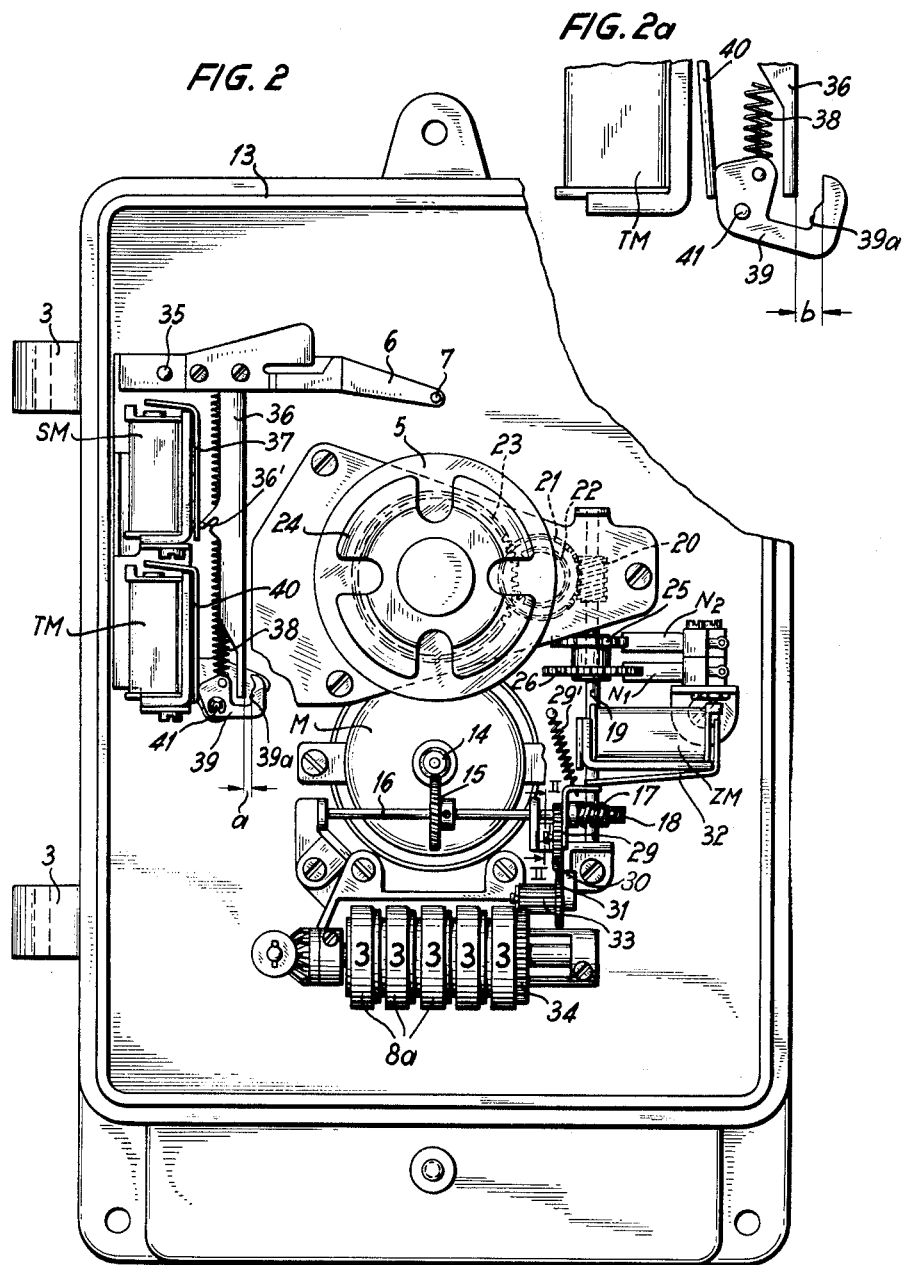

United States Patent Office 3,228,032
Patented Jan. 4, 1966

3,228,032
RECORDING APPARATUS FOR MAKING
DISTINGUISHABLE RECORDINGS
Oskar Zumkeller, Villingen, Germany, assignor to Kienzle
Apparate G.m.b.H., Villingen Im Schwarzwald, Germany
Filed Oct. 19, 1962, Ser. No. 231,753
Claims priority, application Germany, Oct. 20, 1961,
K 44,973
10 Claims. (Cl. 346—62)

The present invention relates to recording apparatus for making distinguishable recordings, and more particularly to a recording apparatus for recording working periods and idle periods of a machine in such a manner that operational conditions necessitating the stopping of the machine are indicated by distinguishable recordings.

Recording apparatus is known in which a recording member is displaced from its normal position to record a line which is transversely spaced from the recorded line produced in the normal position of the recording means.

Machines cannot be continuously operated during the entire work day, but must be stopped occasionally when certain conditions prevail. Lunch time, the necessity of exchanging a tool, insufficient material, necessary repairs, insufficient orders, and other reasons may require the operator to stop the machine. It is very desirable to have the reason for the stopping of the machine to be recorded in the form of a graph in such a manner that by interpretation of the recorded graph, the reason which the operator to stop the machine becomes apparent to the supervisor. If such reasons are clearly determined, it is possible to plan certain operations in such a manner that the time during which the machine is not operated, is reduced to a minimum. Of course, the recording should not only indicate the reason of the machine stoppage, but also the time at which the machine was stopped, and the duration of the inoperativeness of the machine.

Recording apparatus is known which produces lines spaced from each other and extending transverse to the direction of the zero line recorded in the normal position of the recording means. These transverse lines appear at different distances, so that the recording is not accurate any more when the distance between the transverse lines is great. For example, if a transverse line is made every three minutes, the recording error may be 2.9 minutes. If an attempt is made to reduce this error by moving the record carrier at a higher speed, then more material is required for the record carrier, such as a diagram sheet, resulting in an undesired amount of used diagram sheets, and difficulties in storing great quantities of diagram sheets. Due to this fact, the spacing between two recorded lines according to the prior art should not exceed a certain maximum spacing, if the recordings are to be properly evaluated and short interruptions of the work are to be clearly determinable from an inspection of the diagram. On the other hand, the recordings should be clearly distinguishable by the eye without the necessity of using enlarging lenses.

It is one object of the present invention to improve recording apparatus according to the known art, and to provide recording apparatus which produces clearly distinguishable recordings representing operational conditions of a machine.

Another object of the present invention is to provide recording apparatus in which the recording means is movable to a plurality of recording positions for making distinguishable recordings at different places of the record carrier.

Another object of the present invention is to control the recording means in such a manner that recordings are made at different frequencies while the recording means moves between selected recording positions whereby the thus made recordings are easily distinguishable.

Another object of the present invention is to control the recording means by operator influenced means in such a manner that the operator can select any one of a number of clearly distinguishable recordings to be made which represent different operational conditions causing the operator to stop the machine.

Another object of the invention is to provide recording apparatus capable of making under selective control of the operator distinguishable recordings of different amplitude and frequency.

With these objects in view, the present invention relates to recording apparatus for making distinguishable recordings under control of an operator. One embodiment of the invention comprises recording means movable between a normal position and a plurality of recording positions for making distinguishable recordings at different places of a record carrier moving relative to the recording means; control means for controlling the recording means and having a plurality of conditions to cause movement of the recording means to different recording positions; and operator controlled means for selectively placing the control means in said conditions and actuated by the operator in accordance with prevailing operational conditions. When the operator determines such a prevailing condition requiring, for example, stopping of the machine, he places the control means in the corresponding condition so that a distinguishable record is made on the record carrier representing the respective operational condition so that when the recorded graph is later evaluated, the reasons and operational conditions causing the operator to stop the machine become apparent to a supervisor.

In the preferred embodiment of the invention, operating means including electromagnetic means are provided for actuating the recording means. First control means including an electromagnetic means operating a stop means for controlling the recording means are provided, and permit limiting of the movement of the recording means by the electromagnetic means of the operating means to different recording positions so that the recordings have parts located spaced different distances from the zero line recorded in the normal position of the recording means. Preferably, second control means are provided which supply current at different frequencies to the electromagnetic means of the operating means to effect movement of the recording means to any one of the recording positions at different time intervals. The operating means are constructed and designed in such a manner that the operator can effect a simultaneous control of the recording means by the first and second control means whereby the recordings made are distinguishable not only by different deviations from the zero line recorded in the normal position of the recording means, but also by the freqeuncy at which the deviations occur.

In the preferred embodiment of the invention, the deviations of the recording means from the normal zero line of different extent, but are all located on the same side of the zero line. In a modified embodiment, the recording means may be deflected by the first control means to recording positions located on opposite sides of the zero line recorded in the normal position of the recording means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a plan view illustrating a recording apparatus in accordance with the present invention;

FIG. 2 is a plan view on an enlarged scale illustrating a recording device forming part of the apparatus shown in FIG. 1, with the cover of the device removed;

FIG. 2a is a fragmentary plan view on an enlarged scale illustrating a detail of the device shown in FIG. 2;

FIG. 2b is a fragmentary sectional view taken on line II—II in FIG. 2; and

FIG. 3 is a diagram illustrating the electric circuit of the recording apparatus shown in FIGS. 1 and 2.

Referring now to the drawings, and more particularly to FIG. 1, the apparatus comprises the recording device 1, and a control and indicator device 2. The casing 13 of the recording device 1 has a pair of hinges 3 for supporting a cover or lid 3a which has a circular window 4 through which a diagram sheet or record carrier 45 is partially visible. This record carrier 45 is secured to the rotary support 5. The recording portion of a recording member 6 with the recording stylus 7 also appears behind the window 4 so that the recorded graph can be observed by the operator.

The lower portion of lid 3a has another window 8 through which the number wheels 8a of a counter can be observed. Electrical connections are secured to a series of terminals 9 and combined in a cable 10 to connect the recording device 1 with the control elements located in the casing 2.

Five manually operated pushbuttons $T_1$ to $T_5$ are provided on casing 2 and carry indications representing information on which the operator bases the selection of any one of the pushbuttons $T_1$ to $T_5$ for actuation. An indicator lamp 12 is preferably provided adjacent each pushbutton, and is illuminated in a conventional manner when the respective pushbutton is depressed.

Each pushbutton $T_1$ to $T_5$ is locked in its depressed actuated position, and released upon actuation of another pushbutton, or upon actuation of a clearing pushbutton 11. The clearing pushbutton may be omitted, if clearing of the pushbuttons $T_1$ to $T_5$ is effected by the machine whose operations are recorded. This may be caused by a transmitter switch in the machine effecting closing of a switch operating clearing means for the pushbuttons $T_1$ to $T_5$.

The operator controlled pushbuttons $T_1$ to $T_5$ are respectively used by the operator to cause different distinguishable recordings which are selected to represent different operational conditions which may require the stopping of the machine. For example, pushbutton $T_1$ is operated when the machine is stopped during lunch time, pushbutton $T_2$ is operated when repairs are necessary, pushbutton $T_3$ is operated when insufficient work is ordered, and other pushbuttons for similar reasons. The indications on the pushbuttons $T_1$ to $T_5$ may carry legends identifying such operational conditions, but for the sake of clarity, the pushbuttons in FIG. 1 show indications of graphs produced by the recording means 6, 7 when the respective pushbutton is actuated by the operator.

Referring now to FIG. 2, a synchronous motor M is secured to the casing 13, and drives through a worm 14 and a worm gear 15, a shaft 16 on which another worm gear 17 is mounted. Worm gear 17 meshes with a worm wheel 18 secured to another shaft 19 carrying a worm 20 meshing with a worm wheel 21 which is secured to a gear 22 driving another gear 23. The record carrier support 5 is secured to gear 23 and rotates with the same. A record carrier, such as a circular diagram sheet, not shown, is secured to the rotary support 5 by an attaching member 24.

Shaft 19, which rotates in synchronism with the record carrier, carries two control cams 25 and 26 which respectively cooperate with micro switches $N_1$ and $N_2$ to open and close the switches $N_1$ and $N_2$ at different frequencies. For example, cam 26 may be a very fine toothed gear made of an insulating material, while cam 25 may have four or six cam projections spaced about the periphery thereof, so that cam 26 will produce a great number of electric impulses during each revolution, whereas cam 25 will produce only a small number of impulses. It will be understood that the electric impulse is produced whenever a switch $N_1$ or $N_2$ is closed and thereby closes the path of a current.

An angular member 29 is supported on shaft 16, and turnable supports a gear 30 meshing with a small gear 16b, shown in FIG. 2, secured to shaft 16. A spring 29' is secured to the casing 13 and to the angular member 29 to hold the same in a position such that gear 30 is spaced from a gear 31. However, an electromagnetic means ZM has a movable armature 32 which, when electromagnetic means ZM is energized, engages angular member 29 and shifts the same against the action of spring 29' to a position meshing gear 30 with gear 31. Gear 31 and a pinion 33 secured thereto are turnable about a stud secured to a portion of casing 13, and pinion 33 meshes with the gear 35 of a counter 8a.

As shown in the diagram of FIG. 3, electromagnetic means ZM is connected in series with the switch $MS_1$ so that electromagnetic means ZM is energized when switch $MS_1$ is closed. This switch is controlled by the machine whose operational conditions are to be recorded so that the switch is closed when the macehine is started. Switch $MS_2$ shown in FIG. 3, is also operated by the machine. Switch $MS_1$ is connected in series with electromagnetic means ZM which must be energized as long as the machine runs since it controls the counter to set the counter wheels 8a. Switch $MS_2$ is connected in series with electromagnetic means SM and causes, while the machine is running, recordings in the form of high radial lines produced at the same frequency as the one illustrated for pushbutton $T_1$ in FIG. 1, but being twice as high since switch $MS_2$ is connected in series with cam controlled switch $N_1$ and since switches $K_1$, $K_2$, $K_3$ remain closed when no pushbutton is operated so that the stylus 7 can move a greater distance while stop 39a is in the position of FIG. 2a.

The recording means include a lever 6 mounted for pivotal movement on a stud 35 and having a stylus 7 at the free end thereof which moves in radial direction of the diagram sheets when lever 6 is rocked. Lever 6 has a long transverse arm 36 with a projection 36' cooperating with the movable armature of an electromagnetic means SM.

Another electrical magnetic means TM is mounted in casing 13 adjacent electromagnetic means SM and has a movable armature 40 cooperating with a stop means 39 which is mounted for turning movement on a stud 41 secured to casing 13. A spring 38 connects lever 6 with stop means 39. Stop means 39 has a stop portion 39a cooperating with the lever arm 36.

When both electromagnetic means SM and TM are de-energized, lever 6, 36 and stop means 39 are held by spring 38 in the position illustrated in FIG. 2 in which stop portion 39a is spaced a distance a from the free end of arm 36. When electromagnetic means SM is energized in this position, its armature 37 will act on projection 36' to shift arm 36 with recording lever 6, 7 to an angularly displaced position which is determined by engagement of the free end of arm 36 with stop portion 39a. Since the free end of arm 36 can move only in the distance a, recording lever 6, 7 performs a corresponding small angular movement, and stylus 7 will make a short radial line on a diagram sheet supported on the turnable support 5. Such a radial line is illustrated on the pushbutton $T_2$ in FIG. 1. If electromagnetic means SM is maintained energized for a period of time during which the rotary support 5 turns with the diagram sheet, the horizontal line shown on pushbutton $T_2$ is produced, and when electromagnetic means SM is de-energized, stylus 7 moves in opposite direction under the action of spring 38 to make the second radial line on the right side of the recording shown on pushbutton $T_2$. However, if electromagnetic means TM is energized, its armature 40 moves to the position shown in FIG. 2a and engages stop means 39 to turn the same to a second position in which stop portion 39a is spaced a greater distance b from the free end of lever arm 36.

When the electromagnetic operating means SM are energized in this condition of the control means TM and 39, arm 36 can swing through a greater angle corresponding to the greater distance b, and recording lever 6 will be angularly displaced through a corresponding angle so that stylus 7 will make a longer radial line out of the normal position thereof. Such a radial line appears in FIG. 1 on the pushbutton $T_5$. If electromagnetic means SM is maintained energized, a horizontal line transversely and radially spaced from the zero line produced in the normal position of stylus 7 will be made, as shown on pushbutton $T_5$. When electromagnetic means SM is de-energized, spring 38 will turn lever 8 to its normal position whereby the second radial line appearing on pushbutton $T_5$ is FIG. 1 will be made. It will be noted that the recordings are made in different recording positions of the recording means 6, 7 according to the condition of the electromagnetic control means TM which may be de-energized, or energized.

The circuit of the apparatus will now be described with reference to FIG. 3. The synchronous motor M is connected to a source of alternating current, and is connected to the primary winding of a transformer T whose secondary winding is connected to a rectifier G so that a direct current is supplied to the apparatus. One terminal of rectifier G is connected to electromagnetic means TM, ZM, and SM directly, and the other terminal is connected to several switches, as will be described hereinafter.

The pushbuttons $T_1$, $T_2$ and $T_3$ operate two switches, respectively, and pushbuttons $T_4$ and $T_5$ operate only one switch.

Operation of pushbutton $T_1$ opens switch $K_1$ and closes switch $K_2$. Operation of pushbutton $T_2$ opens switch $K_3$ and closes switch $K_4$. Operation of pushbutton $T_3$ opens switch 5 and closes switch 6. Operation of pushbutton $T_4$ closes switch $K_7$, while switches $K_1$, $K_3$ and $K_5$ remain closed. Operation of pushbutton $T_5$ closes switch $K_8$ while switches $K_1$, $K_3$ and $K_5$ remain closed. Switches $K_1$, $K_3$ and $K_5$ are connected in series with each other and with the electromagnetic control means TM.

The electromagnetic operating means SM is connected in series with several circuit parts which are connected in parallel with each other. Electromagnetic operating means SM is energized when switch $K_6$ is closed by pushbutton $T_3$ simultaneously with the closing of cam operated switch $N_2$. Closing of switch $K_7$ by pushbutton $T_4$ also effects energizing of electromagnetic means SM by the cam operated switch $N_2$. Electromagnetic means SM is also energized when switch $K_2$ is closed by pushbutton $T_1$ and cam operated switch $N_1$ is simultaneously closed. Electromagnetic means SM is also energized when switch $K_4$ is closed by pushbutton $T_2$, or when switch $K_8$ is closed by pushbutton $T_5$, or when a switch $MS_2$ is closed by the machine whose running time is to be recorded.

Assuming that switch $T_1$ is manually closed by the operator, switch $K_1$ opens and switch $K_2$ closes. Electromagnetic means TM is de-energized so that stop means 39 of the first control means TM and 39 remains in the position shown in FIG. 2 in which the operating means SM can shift the recording means 6, 7 only a distance corresponding to the distance a between lever arm 36 and stop portion 39a. Electromagnetic means SM is connected to the rectifier over the closed switch $K_2$, and the control switch $N_1$ so that electromagnetic means SM is energized at the frequency at which control switch $N_1$ is closed by the projections of cam 26. When electromagnetic means SM is energized or de-energized, lever 6 with stylus 7 is moved so that the stylus records in the record sheet which has a greater radius than support 5. Since the record sheet 45 turns, lines as shown in the left portion of FIG. 1 are recorded, and the shape of the recorded line depends on which pushbutton is operated. Since cam 26 has a great number of projections, the frequency of the impulses is very high so that a very closely spaced zig-zag line is recorded on the diagram sheet, assuming a corresponding slow rotation of the support 5. The recording will appear as a narrow beam, as shown on the pushbutton $T_1$ in FIG. 1. The transverse height of the beam will correspond to the distance a. If pushbutton $T_3$ or $T_4$ is energized, the control contact $N_2$ is connected into the circuit, and electromagnetic means SM will be energized at a different frequency and at different time intervals corresponding to the fewer projections of cam 25. When pushbutton $T_3$ is actuated, switch $K_5$ is opened and electromagnetic control means TM is de-energized and inoperative so that the projections of the recording are of a height corresponding to the distance a, as shown in FIG. 1 on pushbutton $T_3$.

When pushbutton $T_4$ or $T_5$ is actuated, switches $K_1$, $K_2$, $K_5$ remain closed, and consequently electromagnetic control means TM is energized and shifts control stop 39 to the position of FIG. 2a so that the electromagnetic operating means SM can shift the recording means 6, 7 a greater distance corresponding to the distance b, resulting in a recording of greater transverse height as shown on the pushbuttons $T_4$ and $T_5$ in FIG. 1. Pushbutton $T_4$ closes switch $K_7$ so that electromagnetic means SM is energized by switch $N_2$ at a low frequency determined by cam 25 so that recordings as shown in FIG. 1 adjacent pushbutton $T_4$ are recorded.

Pushbutton $T_5$ energizes electromagnetic means SM by closing switch $K_8$, causing recording of a radial line, and then recording of a circular line as long as electromagnetic means SM is energized.

Consequently, shaft 19, cams 25 and 26, and switches $N_1$ and $N_2$ constitute second control means controlling the electromagnetic operating means SM to effect movement of the recording means 6, 7 at different frequencies. Under control of the operator controlled pushbuttons, the second control means are placed in two different conditions in which either control switch $N_1$ or control switch $N_2$ is operative.

Whenever a condition arises which requires the stopping of the machine, the operator depresses the pushbutton associated with the respective operational condition, and a corresponding identifiable recording is made. The person interpreting the diagram sheet after completion, knows which characteristic recording pertains to a particular operational condition, so that the diagrams can be evaluated for planning and control of operations.

It will be understood that each of the elements described above, or two or more together, may also find a useful application in other types of recording apparatus differing from the types described above.

While the invention has been illustrated and described as embodied in a recording apparatus for making recordings distinguishable by different height and frequency of deflections from a normal position, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications.

What is claimed as new and desired to be secured by Letters Patent is:

1. Recording apparatus for making distinguishable recordings comprising, in combination, a record carrier; drive means for driving said record carrier at a constant speed; recording means movable between a normal recording position, at least one intermediate position and an outer recording position for making distinguishable recordings on said record carrier; electromagnetic operating means for moving said recording means from said normal to said outer position; first control means for limiting the movement of said recording means by said operating means in said intermediate position; second control means for opening and closing the circuit of said electromagnetic operating means at different frequencies; and manually controlled means for simultaneously actuating said first and second control means to simultaneously control said operating means so as to cause different composite recording movements of said recording means.

2. Recording apparatus for making distinguishable recordings comprising, in combination, a record carrier; drive means for driving said record carrier at a constant speed; recording means movable between a normal recording position, at least one intermediate position and an outer recording position for making distinguishable recordings on said record carrier; operating means including first electromagnetic means for moving said recording means from said normal to said outer position; first control means including second electromagnetic means for limiting the movement of said recording means by said operating means in said intermediate position; second control means comprising first switch means in the circuit of said first electromagnetic means and actuating means for said switch means driven by said drive means for opening and closing the circuit of said first electromagnetic means at different frequencies; and manually controlled means comprising a plurality of manually operated second switch means for simultaneously actuating second electromagnetic means and said second control means to simultaneously control said operating means so as to cause different composite recording movements of said recording means.

3. Recording apparatus for making distinguishable recordings, comprising, in combination, recording means movable between a normal position and a plurality of recording positions for making distinguishable recordings on a record carrier moving relative to said recording means; operating means including first electro-magnetic means for actuating said recording means; first control means including second electro-magnetic means for controlling said recording means and having a plurality of conditions to cause movement of said recording means by said operating means to different recording positions; second control means having a plurality of conditions for supplying current at different frequencies to said first electro-magnetic means for controlling said operating means to effect movements of said recording means to any one of said recording positions at different frequencies; and manually controlled means for selectively placing said first and second control means simultaneously in selected ones of said conditions thereof so as to cause different composite recording movements of said recording means.

4. Recording apparatus, comprising, in combination, recording means movable between a normal position and a plurality of recording positions for making distinguishable recordings on a record carrier moving relative to said recording means; operating means including electromagnetic operating means for actuating said recording means; first control means including electro-magnetic control means for controlling said recording means and having a plurality of conditions to cause movement of said recording means by said electro-magnetic operating means to different recording positions; second control means including a plurality of control switches, and a plurality of rotary cams having different numbers of cam projections and respectively cooperating with said control switches to close the same at different frequencies, said control switches being connected into the circuit of said electromagnetic operating means; and a plurality of manually operated switches connected into the circuit of said electro-magnetic control means and of said control switches for selectively causing energizing or non-energizing of said electro-magnetic control means, and simultaneously therewith energizing of said electromagnetic operating means at different frequencies so as to cause different composite recording movements of said recording means.

5. Recording apparatus, comprising, in combination, recording means movable between a normal position and a plurality of recording positions for making distinguishable recordings on a record carrier moving relative to said recording means; electromagnetic operating means having an armature operatively connected to said recording means to move the same out of said normal position when said electro-magnetic operating means is energized; a movable stop means having a plurality of stop positions for blocking movement of said recording means by said electromagnetic operating means in a plurality of different recording positions; electromagnetic control means having an armature cooperating with said stop means to move the same between said stop positions; a plurality of impulse creating means for simultaneously energizing or non-energizing said electromagnetic operating means at different frequencies whereby said electromagnetic operating means moves said recording means to any one of said recording positions at different frequencies; and manually controlled means for selectively connecting said impulse creating means with said electromagnetic operating means and for energizing said electromagnetic control means to operate said stop means so as to cause different composite recording movements of said recording means.

6. Recording apparatus, comprising, in combination, recording means movable between a normal position and a plurality of recording positions for making distinguishable recordings on a record carrier moving relative to said recording means; electromagnetic operating means having an armature operatively connected to said recording means to move the same out of said normal position when said first electro-magnetic means is energized; a movable stop means having a plurality of stop positions for blocking movement of said recording means by said electromagnetic operating means in a plurality of different recording positions; electromagnetic control means having an armature cooperating with said stop means to move the same between said stop positions; control means including a plurality of control switches, and a plurality of rotary cams having different numbers of cam projections and respectively cooperating with said control switches to close the same at different frequencies, said control switches being connected parallel with each other and in series with said electro-magnetic operating means; and a plurality of manually operated switches connected into the circuit of said electro-magnetic control means and of said control switches for selectively causing energizing or non-energizing of said electro-magnetic control means, and simultaneously therewith energizing of said electromagnetic operating means at different frequencies so as to cause different composite recording movements of said recording means.

7. An apparatus as set forth in claim 6 wherein said manually operated switches include a plurality of first switches connected in series with each other and with said electro-magnetic control means, and a plurality of second switches respectively connected in series with said control switches; and a plurality of operator influenced push buttons for simultaneously operating one of said first switches and one of said second switches, respectively.

8. Recording apparatus, comprising, in combination, rotary support means for a record carrier; recording means movable between a normal position and a plurality of recording positions for making distiguishable recordings on said record carrier; electromagnetic operating means having an armature operatively connected to said recording means to move the same out of said normal position when said first electro-magnetic means is energized; a movable stop means having a plurality of stop positions for blocking movement of said recording means by said electromagnetic operating means in a plurality of different recording positions; electromagnetic control means having an armature cooperating with said stop means to move the same between said stop positions; control means including a plurality of control switches, and a plurality of rotary cams having different numbers of cam projections and respectively cooperating with said control switches to close the same at different frequencies, said control switches being connected parallel with each other and in series with said electro-magnetic operating means; drive means rotating at constant speed and connected to said rotary support means and to said rotary cams for driving the same; and a plurality of manually operated switches connected into the circuit of said electro-magnetic control means and of said control switches for selectively causing energizing or non-energizing of said electro-magnetic control means, and simultaneously therewith energizing of said electro-magnetic operating means at different frequencies so as to cause different composite recording movements of said recording means.

9. A recording apparatus for making distinguishable recordings, comprising, in combination, a support for a record carrier and driven at a constant speed; and recording means including a recording stylus movable between a normal position for moving along a path over said record carrier, and displaced recording positions; operating means for actuating said recording means; first control means for controlling said recording means and having a plurality of conditions to cause movements of said recording means and stylus by said operating means to different recording positions; second control means having a plurality of conditions for controlling said operating means to cause different recording movements of said stylus while said recording means are actuated by said operating means; and manually controlled means for selectively placing said first and second control means simultaneously in selected ones of said different conditions thereof so as to cause different composite recording movements of said recording means.

10. A recording apparatus for making distinguishable recordings, comprising, in combination, a support for a record carrier and driven at a constant speed; and recording means including a recording stylus movable between a normal position for moving along a path over said record carrier, and displaced recording positions; operating means for actuating said recording means; first control means for controlling said recording means and having a plurality of conditions to cause movement of said recording means by said operating means to different recording positions; second control means having a plurality of conditions for controlling said operating means to effect movements of said recording means to any one of said recording positions at different frequencies; and manually controlled actuating means movable between a plurality of actuating positions for placing in at least some of said actuating positions, said first and second control means simultaneously in selected ones of said different conditions thereof so as to simultaneously control said operating means whereby different distinguishable recordings are made on the record carrier.

References Cited by the Examiner

UNITED STATES PATENTS

| | | | |
|---|---|---|---|
| 1,098,932 | 6/1914 | Akimoff | 73—391 |
| 1,322,148 | 11/1919 | Sprague | 346—62 |
| 1,480,734 | 1/1924 | Nelson | 346—139 |
| 2,006,882 | 7/1935 | Cleveland et al. | 346—36 |
| 2,034,943 | 3/1936 | Dyer | 274—10 |
| 2,684,279 | 7/1954 | Imm | 346—123 |
| 2,684,280 | 7/1954 | Opocensky et al. | 346—123 |

LEO SMILOW, *Primary Examiner.*

LEYLAND M. MARTIN, *Examiner.*